United States Patent [19] [11] 3,906,025
Hellerbach et al. [45] Sept. 16, 1975

[54] (2-AMINOBENZOPHENONE) ACETONITRILES

[75] Inventors: Joseph Hellerbach, Basel; Guido Zanetti, Reinach, both of Switzerland

[73] Assignee: Hoffmann-La Roche Inc., Nutley, N.J.

[22] Filed: Oct. 8, 1974

[21] Appl. No.: 513,024

Related U.S. Application Data

[62] Division of Ser. No. 253,604, May 15, 1972, abandoned.

[30] Foreign Application Priority Data

June 22, 1971 Switzerland.......................... 9106/71
Apr. 11, 1972 Switzerland.......................... 5287/72

[52] U.S. Cl...................... 260/465 E; 260/239 BD
[51] Int. Cl.²......................................... C07C 121/78
[58] Field of Search .................................. 260/465 E

[56] References Cited
UNITED STATES PATENTS
3,131,178    4/1964    Archer et al....................... 260/239

*Primary Examiner*—Lewis Gotts
*Assistant Examiner*—Dolph H. Torrence
*Attorney, Agent, or Firm*—Samuel L. Welt; Bernard S. Leon; Frank P. Hoffman

[57] ABSTRACT

A process for preparing 1,4-benzodiazepines via the catalytic hydrogenation of the corresponding α-(2-aminobenzophenone)acetonitrile. The products obtainable by this process are known compounds and are useful as sedatives, anti-convulsants and muscle relaxants.

3 Claims, No Drawings

(2-AMINOBENZOPHENONE) ACETONITRILES

This is a division of application Ser. No. 253,604, filed May 15, 1972, and now abandoned.

DETAILED DESCRIPTION OF THE INVENTION

The present invention relates to a process for preparing known and pharmacologically valuable 1,4-benzodiazepines. More particularly, the present invention is concerned with the preparation of these benzodiazepine derivatives via the catalytic hydrogenation of the corresponding α-(2-aminobenzophenone)acetonitrile. The end products of this reaction are useful as sedative, anti-convulsant and muscle relaxant agents.

Following the process of the present invention, one can prepare benzodiazepine derivatives of the formula

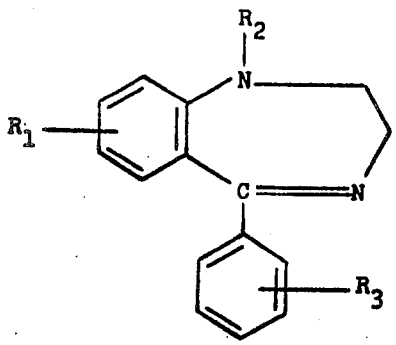

I wherein $R_1$ is selected from the group consisting of hydrogen, halogen or trifluoromethyl; $R_2$ signifies hydrogen or lower alkyl; and $R_3$ signifies hydrogen or halogen.

As used throughout this disclosure, the term "lower alkyl" denotes both straight and branched chain saturated hydrocarbon groups containing from 1–7 carbon atoms, preferably from 1–4 carbon atoms, for example, ethyl, methyl, propyl, isopropyl, butyl and the like. The term "halogen" relates to all four forms thereof, i.e., chlorine, fluorine, bromine and iodine, unless indicated otherwise.

In following the novel process of the present invention, the known and useful compounds of formula I above are prepared by the catalytic hydrogenation of the corresponding α-(2-aminobenzophenone)acetonitrile of the formula

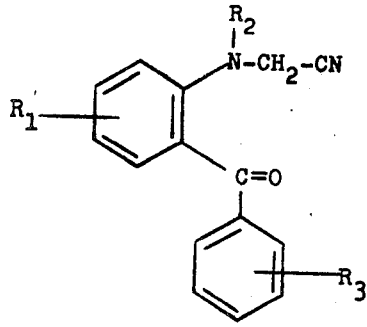

II wherein $R_1$–$R_3$ are as described above in the presence of Raney nickel or Raney cobalt.

In a preferred aspect of the present invention, $R_1$ in the starting material of formula II is halogen, $R_2$ is hydrogen or a lower alkyl group containing from 1–4 carbon atoms, and $R_3$ is hydrogen or halogen located at the 2'-position of the benzophenone moiety. In a more preferred aspect, the $R_1$ substituent in the starting material of formula II is halogen, preferably chlorine, located at the 5-position of the benzophenone moiety; $R_2$ is methyl or hydrogen and $R_3$ is hydrogen; so that by following the novel process of the present invention there is obtained a compound of the formula

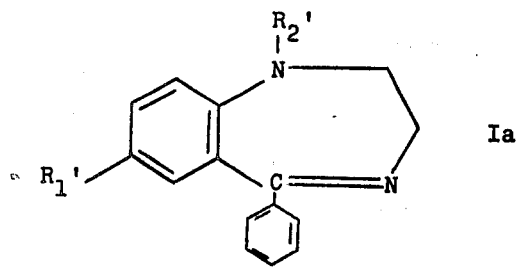

Ia wherein $R_1'$ signifies halogen, preferably chlorine and $R_2'$ signifies hydrogen or methyl.

The catalytic hydrogenation of a compound of formula II can be carried out in an inert organic solvent. Examples of such inert solvents are alkanols, preferably methanol or ethanol, ethers, preferably dioxane, to which water can optionally be added, or dimethylformamide. If the catalytic hydrogenation is not carried out in an autoclave, a temperature between 10°C. and 40°C. is expediently maintained, with room temperature being the most preferred. If the catalytic hydrogenation is carried out at higher temperatures, for example, at about 100°C., it is preferably carried out in an autoclave.

The catalytic hydrogenation can be carried out both at atmospheric pressure and at an elevated pressure. If the catalytic hydrogenation is carried out at an elevated pressure, it must likewise be carried out in an autoclave. It is particularly preferred to carry out the catalytic hydrogenation at atmospheric pressure.

The compounds of formula II used as the starting materials in the process of the present invention are novel and as such form a part of the present invention. These compounds are prepared by reacting an aminobenzophenone of the formula

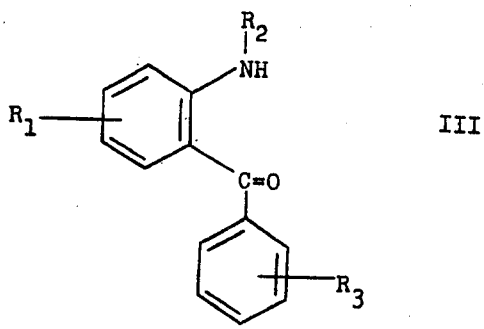

III wherein $R_1$–$R_3$ are as described above with a haloacetonitrile. Suitable haloacetonitriles for this purpose include chloroacetonitrile, bromoacetonitrile and iodoacetonitrile.

In this reaction between the compound of formula III and the haloacetonitrile, the haloacetonitrile, for example, chloroacetonitrile, can serve not only as one of the reactants, but also as the reaction solvent. In a preferred embodiment, when chloroacetonitrile is used, an alkali metal bromide, preferably sodium bromide, or an alkali metal iodide, preferably sodium or potassium iodide, is added to the reaction mixture. Of these, potassium iodide is the most preferred. This reaction can, however, also be carried out in the presence of an inert solvent such as dimethylformamide. It is expedient to carry out this reaction at an elevated temperature, preferably at the reflux temperature of the reaction mixture.

The following examples are illustrative but not limitative of the present invention.

EXAMPLE 1

A suspension of 11.4 g of (2-benzoyl-chloro-N-methylanilino)-acetonitrile-chloro-N-methylanilino)-acetonitrile and about 5 g of Raney-nickel in 200 ml of alcohol is hydrogenated until the uptake of hydrogen comes to a standstill. The catalyst is separated off and the filtrate is evaporated to dryness at 40°C in a vacuum. The residue is partially dissolved in 700 ml of boiling petroleum ether (40°–45°C). The insoluble material (1.0 g) is separated off and the filtrate is heated to boiling with 1 g of activated charcoal and then filtered. The activated charcoal is washed with a further 200 ml of boiling petroleum ether (40°–45°C). The filtrate is evaporated to about 100 ml. After standing overnight, the 7-chloro-1-methyl-5-phenyl-2,3-dihydro-1H-1,4-benzodiazepine which has crystallized out is filtered off by suction, washed with petroleum ether (40°–45°C) and dried; melting point 100°–101°C.

The starting material can be prepared according to one of the following four methods:

A. A solution of 123 g (0.5 mol) of 2-methylamino-5-chlorobenzophenone in 320 ml of chloroacetonitrile is boiled under reflux for 20 hours with the exclusion of moisture. The dark solution is poured into 1.5 liters of ice-water. The mixture is treated with sodium bicarbonate until it is weakly alkaline and then extracted with 1 liter of ethyl acetate. The ethyl acetate solution is washed with 750 ml of water. The aqueous solutions are extracted with 1 liter of ethyl acetate. The ethyl acetate phases are combined, dried over magnesium sulphate, filtered and evaporated to dryness at 40°C in a vacuum. The residual oil (150 g) is dissolved in 150 ml of cyclohexane/methylene chloride (1:3) and chromatographed on 2.5 kg of Silica gel (Merck). Elution of the column with cyclohexane/methylene chloride (1:3) yields, after discarding the first fractions, (2-benzoyl-4-chloro-N-methylanilino)-acetonitrile which is recrystallized from ether; melting point 68°–69°C.

B. A mixture of 24.6 g of 2-methylamino-5-chlorobenzophenone and 83 g of potassium iodide in 150 ml of absolute dimethylformamide is heated dropwise with stirring and exclusion of moisture at 100°C over a period of 2 hours with 37.8 g of chloroacetonitrile. The mixture is stirred for a further 7 hours at 100°C and then evaporated to dryness at 70°C in a vacuum. The residue is treated with a solution of 80 g of sodium thiosulphate in 400 ml of water and the precipitated product is extracted with two 300 ml portions of ethyl acetate. The ethyl acetate phases are washed with two 300 ml portions of water, combined, dried over magnesium sulphate and evaporated to dryness at 40°C in a vacuum. The residue is dissolved in 50 ml of methanol. After standing for 20 hours at 4°C, the (2-benzoyl-4-chloro-N-methylanilino)-acetonitrile which has crystallized out is separated off, washed with a small amount of methanol and dried and then has a melting point of 68°–69°C. The mother-liquor is freed from the solvent at 40°C in a vacuum. The residue is dissolved in 50 ml. of methylene chloride/cyclohexane (3:1) and chromatographed on 500 g of Silica gel (Merck). Elution of the column with methylene chloride/cyclohexane (3:1) yields a further portion of (2-benzoyl-4-chloro-N-methylanilino)-acetonitrile of melting point 68°–69°C.

C. A mixture of 24.6 g of 2-methylamino-5-chlorobenzophenone and 75 g of sodium iodide in 150 ml of absolute dimethylformamide is treated dropwise with stirring and exclusion of moisture at 100°C over a period of 2 hours with 37.8 g of chloroacetonitrile. The mixture is stirred for a further 7 hours at 100°C and then evaporated to dryness at 70°C in a vacuum. The residue is treated with a solution of 80 g of sodium thiosulphate in 400 ml of water and the precipitated product is extracted with two 300 ml portions of ethyl acetate. The ethyl acetate phases are washed with two 300 ml portions of water, combined, dried over magnesium sulphate and evaporated to dryness at 40°C in a vacuum. The residue is dissolved in 100 ml of methylene chloride/cyclohexane (3:1) and chromatographed on 1 kg of Silica gel (Merck). Elution of the column with methylene chloride/cyclohexane (3:1) yields (2-benzoyl-4-chloro-N-methylanilino)-acetonitrile of melting point 68°–69°C.

D. A mixture of 12.3 g of 2-methylamino-5-chlorobenzophenone and 33.3 g of iodoacetonitrile in 50 ml of absolute dimethylformamide is stirred at 100°C for 6 hours with the exclusion of moisture. The dimethylformamide is removed at 70°C in a vacuum and the residue is treated with a solution of 25 g of sodium thiosulphate in 300 ml of water. The precipitated product is extracted with two 300 ml portions of ethyl acetate. The ethyl acetate phases are washed with two 300 ml. portions of water, combined, dried over magnesium sulfate and evaporated at 40°C. in a vacuum. The residue is dissolved in 30 ml. of methanol. After standing for 20 hours at 4°C., the (2-benzoyl-4-chloro-N-methylanilino)-acetonitrile which has crystallized out is separated off, washed with a small amount of methanol and dried and then has a melting point of 68°–69°C. The mother liquor is evaporated to dryness at 40°C. in a vacuum. The residue is dissolved in 30 ml. of methylene chloride/cyclohexane (3:1) and chromatographed on 200 g. of silica gel (Merck). Elution of the column with methylene chloride/cyclohexane (3:1) yields a further portion of (2-benzoyl-4-chloro-N-methylanilino)-acetonitrile of melting point 68°–69°C.

EXAMPLE 2

A suspension of 8.5 g. of (2-benzoyl-4-chloro-N-methylanilino)-acetonitrile and 4 g. of Raney cobalt in 200 ml. of alcohol is hydrogenated at 60°C. and 30 atmospheres (gauge). The catalyst is then separated off and the filtrate is evaporated to dryness in a vacuum.

The residue is dissolved in 30 ml. of ethyl acetate and chromatographed on 200 g. of silica gel (Merck). Elution of the column with ethyl acetate yields 7-chloro-1-methyl-5-phenyl-2,3-dihydro-1H-1,4-benzodiazepine of melting point 100°–101°C.

EXAMPLE 3

A suspension of 2.6 g. of N-(2-benzoyl-4-chlorophenyl)-glycinonitrile and about 1 g. of Raney nickel in 100 ml. of alcohol is hydrogenated until the uptake of hydrogen comes to a standstill. The catalyst is separated off and the filtrate is evaporated to dryness in a vacuum. The residue is dissolved in 20 ml. of ethyl acetate/methanol (9:1) and chromatographed on 50 g. of silica gel (Merck). Elution of the column with ethyl acetate/methanol (9:1) yields 7-chloro-5-phenyl-1,2-dihydro-3H-1,4-benzodiazepine of melting point 172°–173°C.

The starting material can be prepared according to one of the following three methods:

A. A solution of 23.1 g. of 2-amino-5-chlorobenzophenone in 65 ml. of chloroacetonitrile is boiled under reflux for 2.5 hours with the exclusion of moisture. The resulting dark red solution is poured into 500 ml. of ice water. The mixture is treated with sodium bicarbonate until it is weakly alkaline. The precipitate is separated off and discarded. The filtrate is extracted with two 250 ml. portions of ethyl acetate. The ethyl acetate phases are washed with 100 ml. of water, combined, dried over magnesium sulfate, filtered and evaporated to dryness in a vacuum. The residue is dissolved in 100 ml. of cyclohexane. After standing for 30 minutes at room temperature, the N-(2-benzoyl-4-chlorophenyl)-glycinonitrile which has crystallized out is separated off, washed with cyclohexane and recrystallized from methanol; melting point 174°–176°C.

B. A mixture of 23.2 g. of 2-amino-5-chlorobenzophenone and 83 g. of potassium iodide in 150 ml. of absolute dimethylformamide is treated with stirring and exclusion of moisture at 100°C. over a period of 2.5 hours with 37.8 g. of chloroacetonitrile. The mixture is stirred for a further 6 hours at 100°C. and then evaporated at 70°C. in a vacuum. The residue is treated with a solution of 80 g. of sodium thiosulfate in 400 ml. of water and the precipitated product is extracted with two 400 ml. portions of ethyl acetate. The ethyl acetate phases are washed with two 300 ml. portions of water, combined, dried over magnesium sulfate and evaporated to dryness at 40°C. in a vacuum. Recrystallization of the residue from 400 ml. of ethyl acetate/cyclohexane (1:4) yields N-(2-benzoyl-4-chlorophenyl)-glycinonitrile of melting point 174°–176°C.

C. A mixture of 23.2 g. of 2-amino-5-chlorobenzophenone and 33.3 g. of iodoacetonitrile in 50 ml. of absolute dimethylformamide is stirred at 100°C. for 6 hours with the exclusion of moisture. The dimethylformamide is removed at 70°C. in a vacuum and the residue is treated with a solution of 25 g. of sodium thiosulfate in 300 ml. of water. The precipitated thiosulfate is extracted with two 400 ml. portions of ethyl acetate. The ethyl acetate phases are washed with two 200 ml. portions of water, combined, dried over magnesium sulfate and evaporated at 40°C. in a vacuum. Recrystallization of the residue from 400 ml. of ethyl acetate/cyclohexane (1:4) yields N-(2-benzoyl-4-chlorophenyl)-glycinonitrile of melting point 174°–176°C.

We claim:
1. A compound of the formula

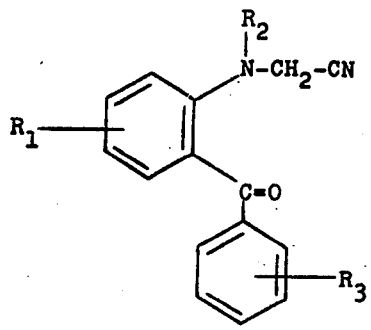

wherein $R_1$ is selected from the group consisting of hydrogen, halogen or trifluoromethyl; $R_2$ signifies hydrogen or lower alkyl; and $R_3$ signifies hydrogen or halogen.

2. The compound of claim 1 of the formula (2-benzoyl-4-chloro-N-methylanilino)-acetonitrile.

3. The compound of claim 1 of the formula N-(2-benzoyl-4-chlorophenyl)-glycinonitrile.

* * * * *